Oct. 8, 1968  S. A. McCLELLAN  3,404,775
SYSTEM FOR TRANSPORTING AND GROUPING OBJECTS
Filed Feb. 6, 1967

Stephen A. McClellan INVENTOR.

United States Patent Office 3,404,775
Patented Oct. 8, 1968

3,404,775
SYSTEM FOR TRANSPORTING AND GROUPING OBJECTS
Stephen A. McClellan, Happy Valley,
Earlysville, Va. 22936
Filed Feb. 6, 1967, Ser. No. 614,239
7 Claims. (Cl. 209—111.6)

ABSTRACT OF THE DISCLOSURE

This invention constitutes primarily a sorting machine which transports bricks or other objects in one general direction on a series of cooperating beltlike conveyors some of which can be actuated by electrical, pneumatic, or other signals to drop selected bricks upon chosen crosswise-moving belts to classify them according to color, finish, or other characteristics. The actuators are operatively connected to a master control which determines the timing of the actuators.

---

This invention relates to conveyor devices and systems and especially to a conveyor for transporting and classifying bricks, tile, or other similar units. This application will employ the word "brick" primarily, but it should be understood that my invention can also be used for tile, building blocks, or other materials or devices.

In the brick or tile manufacturing business, for example, it is important to classify the various units according to color or quality, or both. This has been a slow and painstaking task in many cases in the past and even where automatic color sorting equipment has been used the brick transport, stacking, and separating equipment has often been unsatisfactory with respect to speed, reliability, and accuracy.

In order to overcome the above and other deficiencies of prior equipment, it is an object of my invention to provide brick handling mechanism which will transport brick at a relatively rapid rate as compared with prior equipment.

Another object is to provide brick handling equipment which is reliable in operation and which will cause few break-downs or delays in operation.

A further object is to provide brick handling or similar equipment which is automatic or manual classifying machines or electrical and mechanical means.

Other objects will be evident in the following specification.

Figure 1:
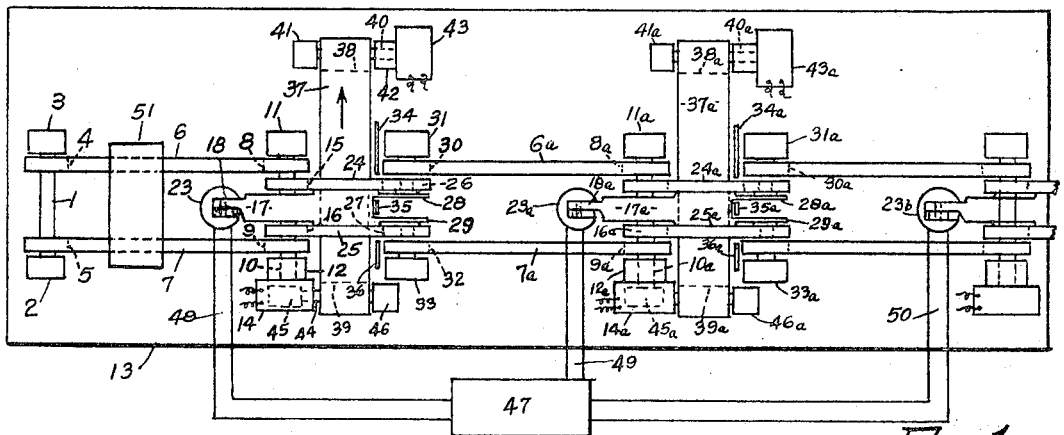
FIGURE 1 is a top plan view of my transporting and classifying machine for bricks and other units.

In FIGURE 1, shaft 1 is rotatably mounted in bearing posts 2 and 3 and carries pulleys 4 and 5 around which respective endless belts 6 and 7 travel to the right, for the upper belt portions. Belt 6 also passes around pulley 8 and belt 7 passes around pulley 9, both of the pulleys being attached to shaft 10 having rotational bearing in posts 11 and 12. These as well as the other bearing posts shown in FIGURE 1 are fastened to base 13. Motor 14, which may be a geared-down motor, is fastened to post 12 and drives shaft 10 at desired speed. Pulleys 15 and 16 are also attached to shaft 10 which passes through a bore in arm 17 so that the shaft serves as a pivot for this arm. If desired, a fixed pivot rod rather than a rotary pivot construction may be used. The narrow end portion 18 of arm 17 is pivotally connected to link 19 (FIG. 2) by means of pivot pin 20 and this link is pivoted at 21 to plunger rod 22 of actuator 23, which may be a solenoid, or pneumatic or hydraulic actuator.

Plate or arm 17 extends underneath belts 24 and 25 and acts as a support for these belts which pass around respective pulleys 15 and 16 and also around respective pulleys 26 and 27. Pulley 26 is rotatably mounted on thin metal tongue 28 extending from member 17 and pulley 27 is similarly mounted on thin metal tongue 29 extending from member 17.

Pulley 30 is rotatably mounted on a stub shaft extending from post 31 and pulley 32 is rotatably mounted on a stub shaft extending from post 33. Thin guide plates 34, 35, and 36 are fastened to the base in the positions shown and cross belt 37 is rotatable around pulleys 38 and 39 in the direction indicated by the arrow. Pulley 38 is carried by shaft 40 which is rotatable in bearings in posts 41 and 42. Motor 43, attached to post 42, is connected to shaft 40 and will drive it at desired speed. Shaft 44 carries pulley 39 and is rotatable in bearings in posts 45 and 46.

Belt 6a passes around pulleys 30 and 8a and belt 7a passes around pulleys 32 and 9a. These pulleys are mounted on shaft 10a driven by motor 14a. Shaft 10a is rotatably mounted in bearings in posts 11a and 12a and the other parts indicated by numerals with suffix "a" are constructed similarly and serve the same functions as the parts previously indicated by similar numerals. Two complete cross-belt units are shown, but the system can have any desired number of these spaced units or assemblies.

Programming or timing unit 47, electrically connected with actuators 23, 23a, and 23b by respective conductors 48, 49, and 50, may be a tape-controlled unit or other type of control which will energize the actuators in desired sequence and at proper times to drop bricks 51 upon the proper belts 37, 37a or the like, in order to separate the bricks or other objects into groups of similar units. As previously stated, the actuators may be of electrical or mechanical construction primarily, or of electromechanical nature. Such devices are known. Conductors 47a may be used to supply color or other information to unit 47, from color testing equipment.

Figure 2:
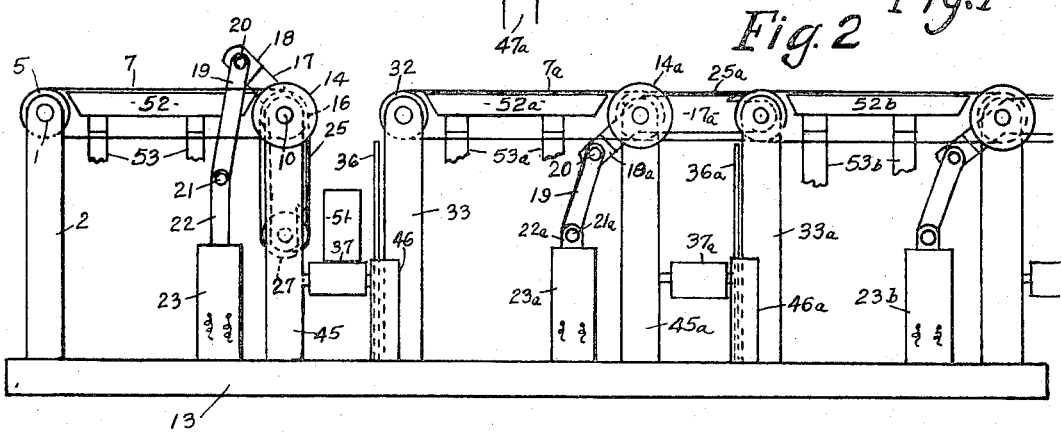
FIGURE 2 is a side elevation of the machine or system shown in FIGURE 1, certain parts being omitted for clarity and some of the parts in FIGURE 2 being shown in different positions.

It is apparent that in FIGURE 1 all three of the actuators are in similar positions and will pass a series of bricks, similar to brick 51, over the cross belts 37 and 37a. In FIGURE 2, however, the actuator 23 is shown energized so that the brick 51 has been dropped down or moving cross belt 37 and is being carried to a human or mechanical receiver not shown. Supports 52, 52a, and 52b are placed under belts 6, 7, and 6a, 7a, etc., and serve to support the belts when loaded with bricks. These supports are fastened to brackets or legs 53, 53a, and 53b which are shown in fragmentary manner. These brackets extend to base 13 and are attached thereto.

In operation, bricks 51 are set on belts 6 and 7 as indicated and are suitably spaced. The moving belts 6 and 7, 24 and 25, 6a and 7a, and so on, carry the bricks to the right, transferring the bricks from one pair of belts to the next. When, however, an actuator unit 23, 23a, 23b, or the like is energized the corresponding plunger is lifted as illustrated by plunger 22 in FIGURE 2, and arm 17–18 and belts 24 and 25 are turned down about shaft 10 as a pivot until the belts are at right angles to their alignment shown in FIGURE 1. Unit 47 times this action so that brick 51 will be dropped onto belt 37 which carries the brick to a human or automatic collector or stacker. The belts 24 and 25 and members 34, 35, and 36 act as guides to keep the bricks properly aligned on belt 37. The same operation can be initiated for any unit of the system.

The actuator 23 may have a spring which quickly returns it to normal position or condition when it is de-energized. Then, if a pulse of energy is applied to any actuator, its arm 17 will be quickly moved out of the path of the next oncoming brick. However, it is a simple matter to design the mechanism so that arm 17 and link 19 do not project above the level of belts 6 and 7.

The belts 24 and 25 may slip slightly on the pulleys if that is desired when they are turned down, or they may be of resilient construction.

Figure 3:
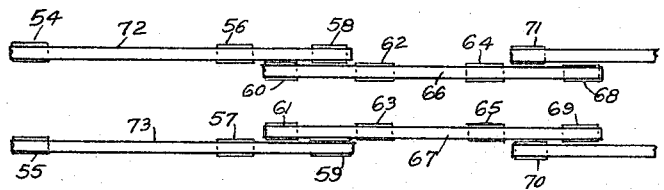
FIGURE 3 is a diagrammatic top plan view of a portion of a transporting and classifying machine or system of alternative construction.
Figure 4:
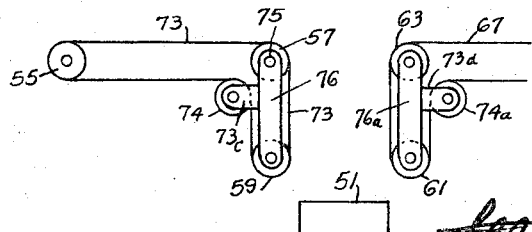
FIGURE 4 is a diagrammatic side elevation showing a portion of the machine of FIGURE 3.

FIGURES 3 and 4 show a construction in which the feed belt and the turn-down portion are unitary. In this modification of the invention two pairs of belt portions are turned down instead of one pair as before. Belt 72 is movable over pulleys 54, 56 and 58 and belt 73 is similarly movable over pulleys 55, 57, and 59. Inner belt 66 is movable over pulleys 60, 62, 64 and 68, and inner belt 67 is movable over pulleys 61, 63, 65, and 69. Some of these pulley pairs may be mounted on a common shaft, as before. As shown in FIGURE 4, pulleys 57 and 59 are rotatably mounted on arm 76 to which is attached arm 73c rotatably supporting guide pulley 74 which serves to take up slack in belt 73 when the arm 76 is turned down about shaft 75, as shown. An elastic belt may be used if desired, as long as it does not affect the timing of the system. The portion of belt 73 between pulleys 57 and 59 is turned down when it is desired to drop brick 51. The portion of belt 72 between pulleys 56 and 58 is concomitantly turned down about the axis of pulleys 56 and 57. Simultaneously, the portions of belts 66 and 67 between respective pulley pairs 60–62 and 61–63 are turned down about the axis of pulleys 62 and 63. This construction has the advantage of being rather simple and the turned down belt portions serve as guides for the released brick. Mechanism generally similar to that previously described can be used to move the pulleys to the desired position.

What I claim is:

1. In a system for transporting and grouping objects, a plurality of first lengthwise spaced substantially aligned endless belts, a plurality of second lengthwise spaced substantially aligned endless belts substantially parallel with said first belts and laterally spaced therefrom and forming pairs of said first and second belts with lengthwise spaces therebetween, means for supporting said belts and means including pulleys for recurving and driving said belts, a plurality of pairs of other endless belts bridging said lengthwise spaces and extending beyond recurved portions of said first and second belts, means including pulleys for supporting and driving said other belts, each pair of said other belts being pivotable about the axis of the driving pulleys of each said pair of said other belts, actuating means for causing any said pair of said other endless belts to swing out of bridging relationship with selected said lengthwise spaces to cause an object carried by said first and second belts to drop by gravity in said selected spaces and means for selectively controlling the energization of said actuators.

2. The system as described in claim 1 and including endless cross belts beneath said lengthwise spaces and movable substantially at right angles to the direction of movement of the other said belts, and means for supporting and driving said cross belts.

3. The system as described in claim 1, the pivot axes of said pairs of other endless belts being coaxial with axes of associated pairs of pulleys of said first and second belts.

4. The system as described in claim 1, said actuating means, when energized, causing a pair of said other endless belts to swing downward below the level of said first and second belts to serve also as guide means for a falling object.

5. The system as described in claim 1, said means for supporting and driving said other belts including shafts driving pulleys for pairs of said first and second belts, members pivotable about said shafts, pairs of pulleys for said other belts carried by said members and rotatable relative thereto, said driving pulleys for said pairs of other belts being driven by said shafts, and said means for driving said pulleys including motors for rotating said shafts.

6. In a system for transporting and grouping objects, a first pair of parallel endless laterally spaced belts, first and second pairs of pulleys at recurving portions of said belts, said belts passing around portions of said pulleys, a first pair of intermediate pulleys in contact with said belts and situated between said first and second pairs of pulleys, a first pair of members pivoting said second pair of pulleys to swing in arcs about the common axis of said intermediate pulleys, a second pair of endless belts substantially parallel with said first pair of belts and laterally off-set therefrom, third and fourth pairs of pulleys at recurving portions of said second pair of belts which pass around portions of said third and fourth pairs of pulleys, a second pair of intermediate pulleys in contact with said second pair of belts and situated between said third and fourth pairs of pulleys, and a second pair of members pivoting said third pair of pulleys to swing in arcs about the axis of said second pair of intermediate pulleys.

7. The system as described in claim 6 and including means for maintaining said belts taut when said members are swung about their pivot axes.

References Cited

UNITED STATES PATENTS 1,955,959    4/1934    Harnischfeger _____ 198—190
2,981,399    4/1961    Parker _____ 198—20

RICHARD E. AEGERTER, *Primary Examiner.*